United States Patent
Lee et al.

(10) Patent No.: US 7,400,560 B2
(45) Date of Patent: Jul. 15, 2008

(54) OPTICAL DISC

(75) Inventors: Kyung-geun Lee, Gyeonggi-do (KR);
Jung-wan Ko, Gyeonggi-do (KR);
In-sik Park, Gyeonggi-do (KR);
Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 11/432,544

(22) Filed: May 12, 2006

(65) Prior Publication Data
US 2006/0203626 A1    Sep. 14, 2006

Related U.S. Application Data

(63) Continuation of application No. 10/259,802, filed on Sep. 30, 2002, now Pat. No. 7,085,221.

(30) Foreign Application Priority Data

Sep. 29, 2001  (KR) .............................. 2001-61042
Nov. 5, 2001   (KR) .............................. 2001-68633

(51) Int. Cl.
*G11B 7/00*    (2006.01)

(52) U.S. Cl. ................. 369/47.27; 369/275.3

(58) Field of Classification Search ............. 369/44.13, 369/275.2, 275.3, 53.22, 44.26, 275.4, 47.1, 369/47.27
See application file for complete search history.

(56) References Cited

U.S. PATENT DOCUMENTS

| | | | |
|---|---|---|---|
| 6,452,897 | B1 | 9/2002 | Van Den Enden |
| 6,590,846 | B2 | 7/2003 | Tosaki et al. |
| 6,621,772 | B2 | 9/2003 | Asano et al. |
| 7,085,221 | B2 | 8/2006 | Lee et al. |

| | | |
|---|---|---|
| 2002/0027869 A1 | 3/2002 | Morita et al. |

FOREIGN PATENT DOCUMENTS

| | | |
|---|---|---|
| CN | 1342976 | 4/2002 |
| JP | 05-036087 | 2/1993 |
| JP | 10-222874 | 8/1998 |
| JP | 10-340453 | 12/1998 |
| JP | 2002-042349 | 2/2002 |
| JP | 2002-260241 | 9/2002 |

OTHER PUBLICATIONS

Japanese Office Action for Related Appliction No. 2002-275414.
U.S. Appl. No. 11/407,110, filed Apr. 20, 2006, Kyung-geun Lee et al., Samsung Electronics Co., Ltd.
U.S. Appl. No. 11/432,543, filed May 12, 2006, Kyung-geun Lee et al., Samsung Electronics Co., Ltd.
U.S. Appl. No. 11/432,542, filed May 12, 2006, Kyung-geun Lee et al., Samsung Electronics Co., Ltd.
U.S. Appl. No. 11/432,541, filed May 12, 2006, Kyung-geun Lee et al., Samsung Electronics Co., Ltd.
Chinese Office Action issued Oct. 12, 2007 in corresponding Chinese Patent Application No. 021444560.

*Primary Examiner*—Nabil Z Hindi
(74) *Attorney, Agent, or Firm*—Staas & Halsey LLP

(57) ABSTRACT

An optical disc includes a read-only area having a first wobble, which is a data wobble formed in the read-only area for only reading, a readable/writable area having a second wobble, which is different from the data wobble, and a connection area between the read-only area and the readable/writable area having a third wobble having the same frequency as one of the first and second wobbles.

6 Claims, 10 Drawing Sheets

FIG. 2 (PRIOR ART)

| | ZONE NAME | SECTOR ADDRESS | NUMBER OF BLOCK | NUMBER OF TRACK | DATA ID |
|---|---|---|---|---|---|
| AREA FOR ONLY READING — 22.6 | | 27AB0h | | | |
| | BLANK (00h) | | | | |
| 23.86 | REFERENCE SIGNAL | 2F000h | 1 | | 2F000h |
| 23.83 | BLANK (00h) | 2F010h | 31 | 1896 | 2F010h |
| | CONTROLLER DATA | 2F200h | 192 | | 2F200h |
| 23.98 | BLANK (00h) | 2FE00h | 32 | | 2FE00h |
| | CONNECTION | 2FFFFh | 2–8 | | |
| 24.00 mm | GUARD TRACK | 30000h | 32 | | 30000h |
| | DISC TEST | 30200h | 64 | | 30200h |
| | DRIVE TEST | 30600h | 112 | | 30600h |
| | GUARD TRACK | 30D00h | 32 | 1888 | 30000h |
| | DISC SELECTION | 30F00h | 8 | | 30F00h |
| | DMA 1&2 | 30F80h | 8 | | 30F80h |
| 24.18 | ZONE 2 | 31000h | 1750 | | 31000h |
| 25.40 | ZONE 1 | 37D60h | 2124 | 1888 | 377E0h |
| 26.75 | | 40220h | | | 3F580h |
| | ZONE 22 | | | | |
| 56.13 | ZONE 23 | 158080h | 4720 | 1888 | 1491E0h |
| 57.53 | DAM 3&4 | 16B480h | 8 | | 16B480h |
| | DISC SELECTION | 16B500h | 8 | | 16B500h |
| | GUARD TRACK | 16B580h | 32 | | 16B580h |
| | DRIVE TEST | 16B780h | 112 | 1446 | 16B780h |
| | DISC TEST | 16BE80h | 112 | | 16BE80h |
| | GUARD TRACK | 16C580h | 1 | | 16C580h |
| 58.60 | | 17966Fh | | | 17966Fh |

LEAD-IN AREA / RECORDABLE AREA / DATA AREA / LEAD-OUT AREA

OPTICAL DISC

CROSS-REFERENCE TO RELATED APPLICATIONS

This application is a Continuation of application Ser. No. 10/259,802, filed Sep. 30, 2002, now U.S. Pat. No. 7,085,221, which claims priority from Korean Patent Application Nos. 2001-61042 and 2001-68633, filed Sep. 29, 2001, and Nov. 5, 2001, respectively, in the Korean Intellectual Property office, the disclosures of which are incorporated herein by reference.

BACKGROUND OF THE INVENTION

1. Field of the Invention

The present invention relates to an optical disc which data is written on, read from, and deleted from, and more particularly, to an optical disc having a data wobble in a read-only area for only reading and another wobble, which is different from the data wobble, in a readable/writable area, and having a connection area between the read-only area and the readable/writable area.

2. Description of the Related Art

In general, optical discs, such as DVD-RAMs, DVD-RWs, DVD+RWs, and DVD-Rs, which data is written on, deleted from, and read from, have been used or proposed. In a case of these optical discs, data only for reading (read-only data), e.g., identification and serial number of the optical disc, a version number of a format book, and a writing strategy, is written in an inner portion of the optical disc in a form of unchangeable pits. A readable/writable area where data can be written to, read from and deleted from, follows a read-only area for only reading to which the read-only data regarding the optical disc is written in the form of the pits. Further, a connection zone is formed to be a physical interface between the read-only area and the readable/writable area.

Japanese Patent Publication No. 1993-258469, as shown in FIG. 1, discloses an optical disc having a mirror area 100 formed between an A area 103, which is only readable, and a B area 105, which can be readable and recordable, to maintain constant angular velocity for obtaining regular data density. The mirror area 100 has wobbling pits wp1 and wp2 containing tracking information at a head of each segment SG but does not contain control information such as address.

A DVD-RAM shown in FIG. 2 includes the connection zone between the read-only area and a recordable area in a lead-in area, and the connection zone is formed of the mirror area having no data within a predetermined radius of the optical disc. The mirror area is required to obtain a time margin to master a wobble and header pits with two beams after mastering the pits, which are the read-only data, with one beam during a manufacturing process of the optical disc. The mirror area also provides a drive with information about a starting point of the recordable area following the read-only area.

FIG. 3 is a view of a connection zone applied to a format of a 4.7 GB DVD-RAM. In detail, the connection zone is formed between a read-only data zone for only reading, in which data is written as embossed characters, and a recordable data zone. On the other hand, a DVD+RW, a DVD-RW, or a DVD-R does not have such a connection zone. Instead of the connection zone in the DVD-RAM of FIG. 3, as shown in FIG. 4, a buffer area 115 is formed at a border between a lead-in area 110 and a data area 120 using address information such as a wobble or a land pre-pit (LPP).

As mentioned above, the prior art establishes the connection zone only when the read-only data is written in the form of the pits. However, in a case that the read-only data is written in the form of the pits and the recordable area is written in the form of groups, it is difficult to obtain good-quality groove characteristics due to different manufacturing conditions of the pits and the grooves. Further, in a high-density and high-capacity disc having multi-recording layers, an optical power loss occurs due to dispersion of a write beam when the write beam is illuminated on a pit area. To solve these problems, it is suggested that the read-only data be written in the form of a groove wobble having grooves with wobbles. However, the use of the groove wobble of different specifications, e.g., frequency, amplitude, track pitch, or phase, in both the read-only area and the readable/writable area, may cause errors due to the wobbles of different specification, e.g., a crosstalk of the wobble at an interface between the read-only area and the readable/writable area. Accordingly, the connection zone is required between the read-only area and the readable/writable area when the read-only data is written as the groove wobble, not as the pit.

SUMMARY OF THE INVENTION

To solve the above and other problems, it is an object of the present invention to provide an optical disc in which read-only data for only reading is written as a first wobble in a read-only area for only reading and a second wobble, which is different from the first wobble, is written in a readable/writable area. The optical disc includes a connection zone between the read-only area for only reading and the readable/writable area, thereby enabling reliable reading/writing operations of a reading and writing apparatus.

It is another object of the present invention to provide an optical disc including an area containing data regarding an ending portion of a read-only area for only reading, thereby enabling efficient reading and writing operations of a reading and writing apparatus.

Additional objects and advantageous of the invention will be set forth in part in the description which follows and, in part, will be obvious from the description, or may be learned by practice of the invention.

To achieve the above and other objects, there is provided an optical disc which data is written on and/or read from. The optical disc including a read-only area for only reading having a first wobble, a readable/writable area having a second wobble that is different from the first wobble, and a connection area formed between the read-only area for only reading and the readable/writable area.

The first wobble has a high frequency (first frequency), and the second wobble has a low frequency (second frequency) lower than that of the first wobble.

The connection area includes a third wobble whose frequency decreases gradually so that the entire frequency can be smoothly reduced from the high frequency of the first wobble to the low frequency of the second wobble.

A first physical address of the readable/writable area is disposed next to a last physical address of the read-only area.

The first wobble is a saw-toothed wobble.

The connection area is a mirror area.

The third wobble in the connection area is different from the first and second wobbles. Tracks of the read-only area, the connection area, and the readable/writable area have the same track pitch.

The connection area includes at least one track. The read-only area includes a header field containing address data, and the readable/writable area includes a wobbled groove containing address data.

The header field is disposed at a beginning or end portion of error correction code (ECC) write units, or at a border between the ECC write units.

The first wobble in the header field has the same low frequency as the second wobble in the readable/writable area.

The optical disc further includes at least one recording layer.

The first frequency of the first wobble is expressed as a function of the second frequency of the second wobble by $f_{HF}=nf_{LF}$, where n is a positive integer, and $f_{HF}$ and $f_{LF}$ denote the first and second frequencies of the first wobble and the second wobble, respectively.

To achieve the above and other objects, there is provided an optical disc that includes a lead-in area, a lead-out area, and a data area, which is disposed between the lead-in area and the lead-out area, and where data is written in and/or read from, and that describes data wobbles that are recorded before writing of data in the data area. The lead-in area includes a read-only area for only reading having a first wobble, a readable/writable area having a second wobble that is different from the first wobble, and a connection area positioned between the read-only area and the readable/writable area.

To achieve the above and other objects, there is provided an optical disc including a read-only area for only reading having a first wobble having a high frequency, an end-marking area disposed next to the read-only area area and containing data representing an end of the read-only area for only reading, a connection area disposed next to the end marking area, and a readable/writable area having a second wobble whose frequency is lower than the high frequency of the first wobble.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 1 and 2 are views of general optical discs each having a connection zone;

DETAILED DESCRIPTION OF THE PREFERRED EMBODIMENTS

Figure 1:
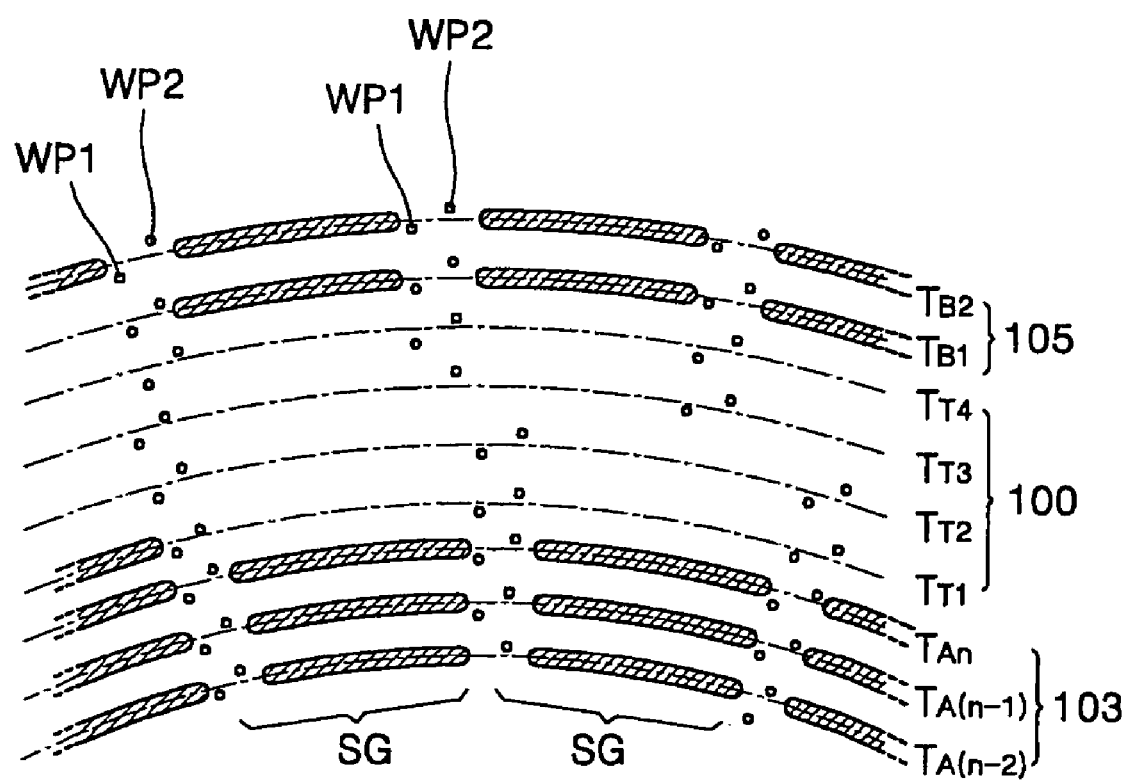
Figure 3:
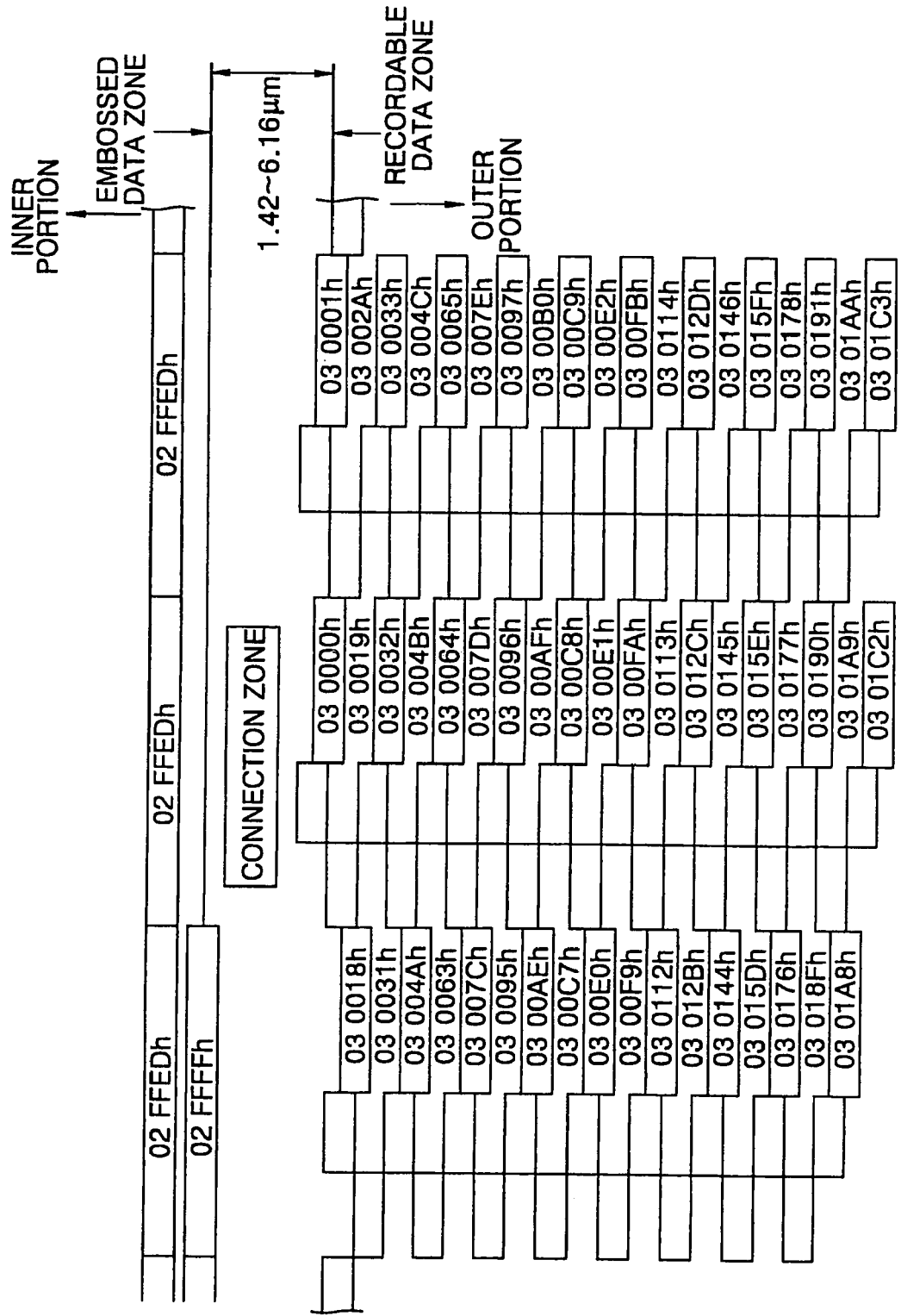
FIG. 3 is a view of a DVD-RAM having the connecting zone in the optical disc system of FIG. 2.
Figure 4:
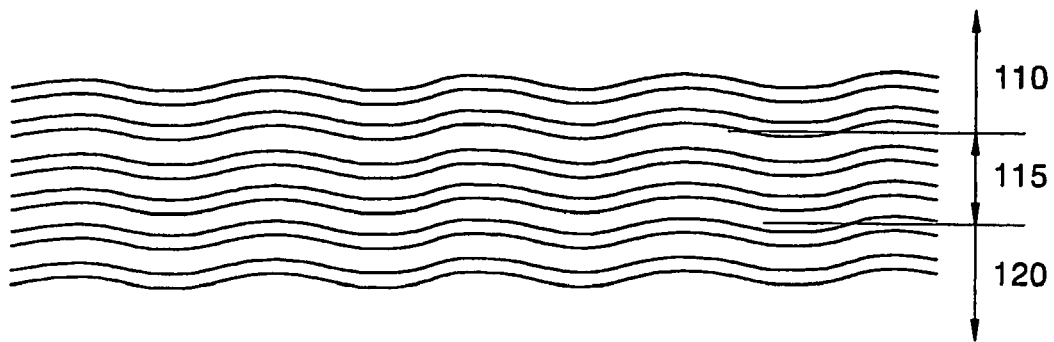
FIG. 4 is a view of another example of the connection zone of the optical disc of FIG. 2.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

A recording medium, e.g., a disc or an optical disc, according to an embodiment of the present invention is a recording/reproducing disc that includes a read-only area 10 for only reading, a readable/writable area 30, and a connection area 20 disposed between the readable/writable area 30 and the read-only area 10. Read-only data for only reading, which is written as information regarding the optical disc or recording parameters in the read-only area 10, is recorded as a predetermined first wobble not to be deleted arbitrarily by a user, and data written in the readable/writable area 30 is recorded as a second wobble which is different from the first wobble. Here, the data written in the readable/writable area 30 may be data for a disc test or a drive test, for example.

Figure 5A:
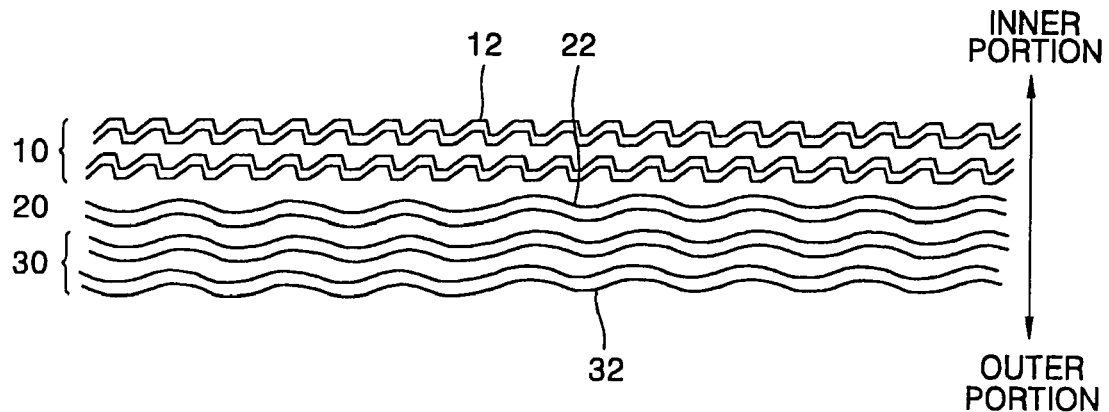
FIGS. 5A through 5C and 6 are an optical disc according to embodiments of the present invention.

The first and second wobbles may be embodied variously if the first and second wobbles are different from each other. For instance, as shown in FIG. 5A, the first wobble and second wobbles may be in a form of a saw-toothed wobble 12 and a waved low-frequency wobble 32, respectively. A third wobble of the connection area 20 may be a low-frequency wobble 22 having the same form as the waved low-frequency wobble 32 of the second wobble.

Figure 5B:
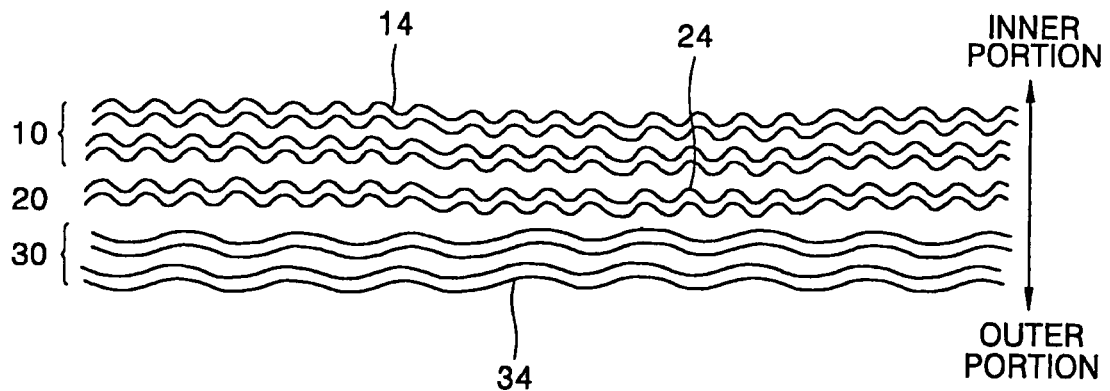

Also, as shown in FIG. 5B, the first wobble may be a high-frequency wobble 14 having a high frequency, and the second wobble may be a low-frequency wobble 34 whose frequency is lower than the high frequency of the first wobble 14. The third wobble in the connection area 20 may be a high-frequency wobble 24 having the same frequency as the high-frequency wobble 14 of the first wobble. Otherwise, the first wobble in the read-only area 10 may have the high frequency, the second wobble in the readable/writable area 30 may have the low frequency, and the third wobble in the connection area 20 may have the same frequency as the second wobble in the readable/writable area 30.

Figure 5C:
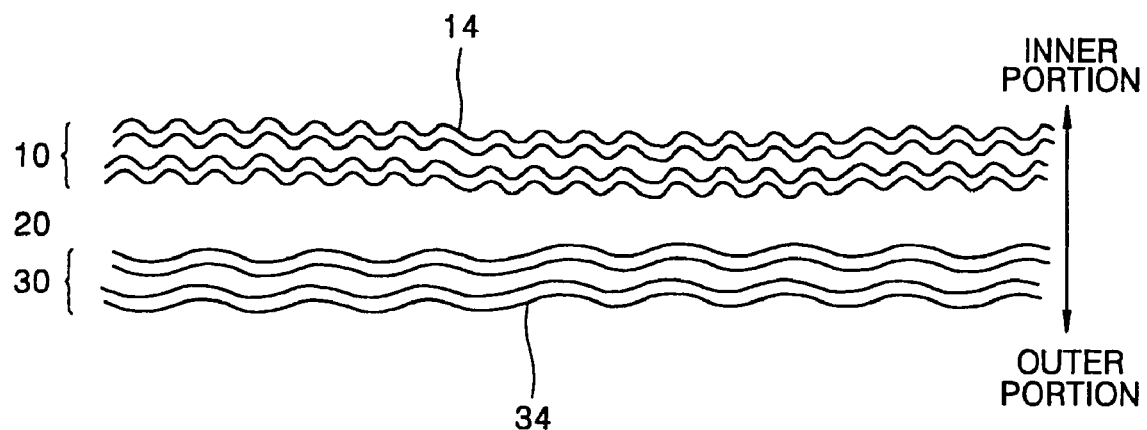

As shown in FIG. 5C, the first wobble in the read-only area 10 may have the high-frequency wobble 14, the second wobble in the readable/writable area 30 may have the low-frequency wobble, and the third wobble of the connection area 20 may be a mirror area.

Figure 6:
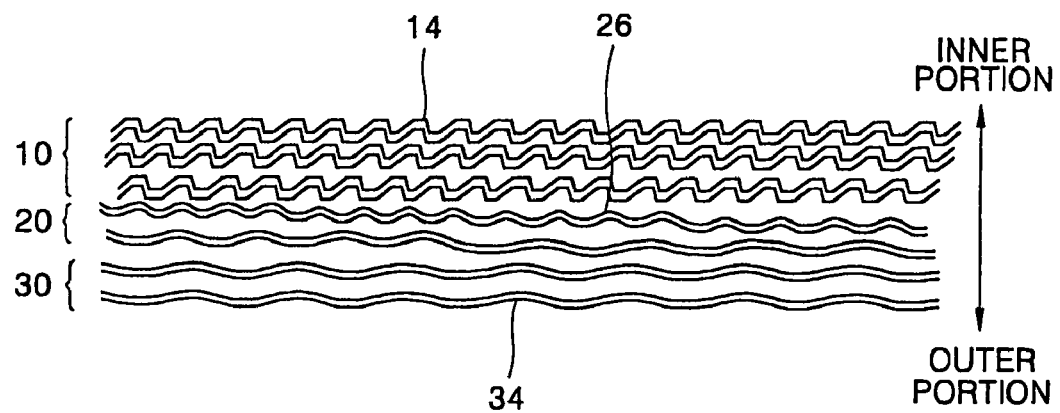

Otherwise, as shown in FIG. 6, the first wobble may have the high-frequency wobble 14 having the high frequency, the second wobble may have the low-frequency wobble 34 having the low frequency, and the third wobble in the connection area 20 may be a wobble 26 whose frequency gradually decreases so that the entire frequency can be smoothly reduced from the high frequency of the first wobble 14 to the low frequency of the second wobble 34. As a result, a transition time appears between the high frequency of the high-frequency wobble 14 in the read-only area 10 and the low frequency of the low-frequency wobble 34 in the readable/writable area 30, thereby increasing a reliability of a read/write signal of a reproducing apparatus, e.g., an optical apparatus, reading/writing the read/write signal from/on the optical disc. In this case, a frequency of a phase locked loop (PLL) of the optical apparatus can be stabilized while reducing a second high-frequency distortion component contained in the low frequency.

Especially, as shown in FIGS. 5A through 6, when the first wobble 12, 14 in the read-only area 10 has the high frequency and the second wobble 32, 34 in the readable/writable area 30 has the low frequency, it is possible that the frequency of the high-frequency wobble (first wobble) 12, 14 is a positive multiple of that of the low-frequency wobble (second wobble) 32, 34. That is, provided that the frequency of the high-frequency wobble is $f_{HF}$ and the frequency of the low-frequency wobble is $f_{LF}$, the following equation (1) is obtained:

$$f_{HF} = nf_{LF} \text{ (n is a positive integer)} \tag{1}$$

As expressed in equation (1), the frequency of the high-frequency wobble is a positive multiple of that of the high-frequency wobble, thus making wobbles in the read-only area 10 and the readable/writable area 30 to be in phase. This embodiment describes a case where the first wobble 12 or 14 is different from the second wobble 32 or 34, respectively, in terms of frequency. These first and second wobbles can be different from each other in terms of amplitude or phase as well.

Figure 7:
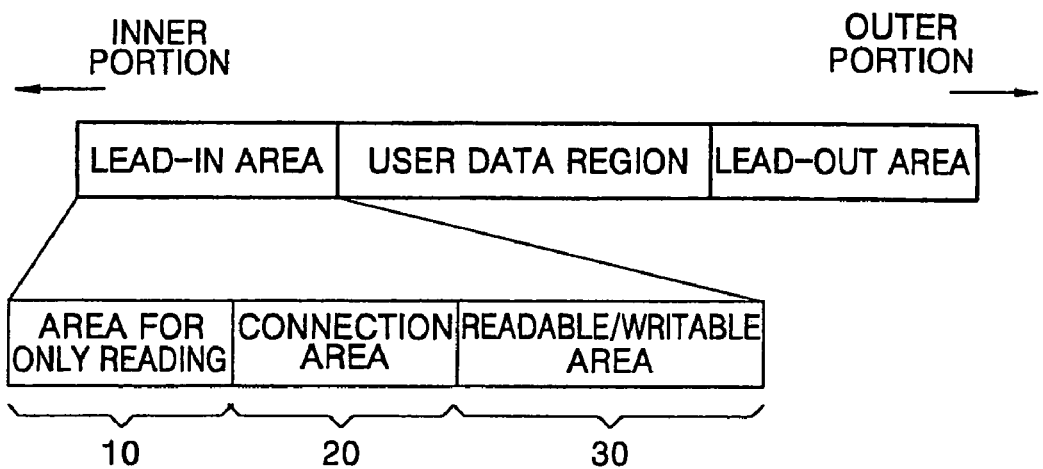
FIG. 7 is a block diagram of a data structure of the optical disc of FIGS. 5A through 6.

Meanwhile, as shown in FIG. 7, a data structure of a DVD is defined, for example, by a lead-in area that contains the read-only data written in an inner portion of the optical disk, a user data area containing user data, and a lead-out area disposed in an outer portion of the optical disk. If the present invention is applied to such a DVD, the lead-in area includes the read-only area 10 in which the read-only data is written as the first wobble 12 or 14, the readable/writable area 30 in which the second wobble 32 or 34, which has different forms from the first wobble 12 or 14, is formed, and the connection area 20 disposed between the read-only area 10 and the readable/writable area 30.

Figure 8:
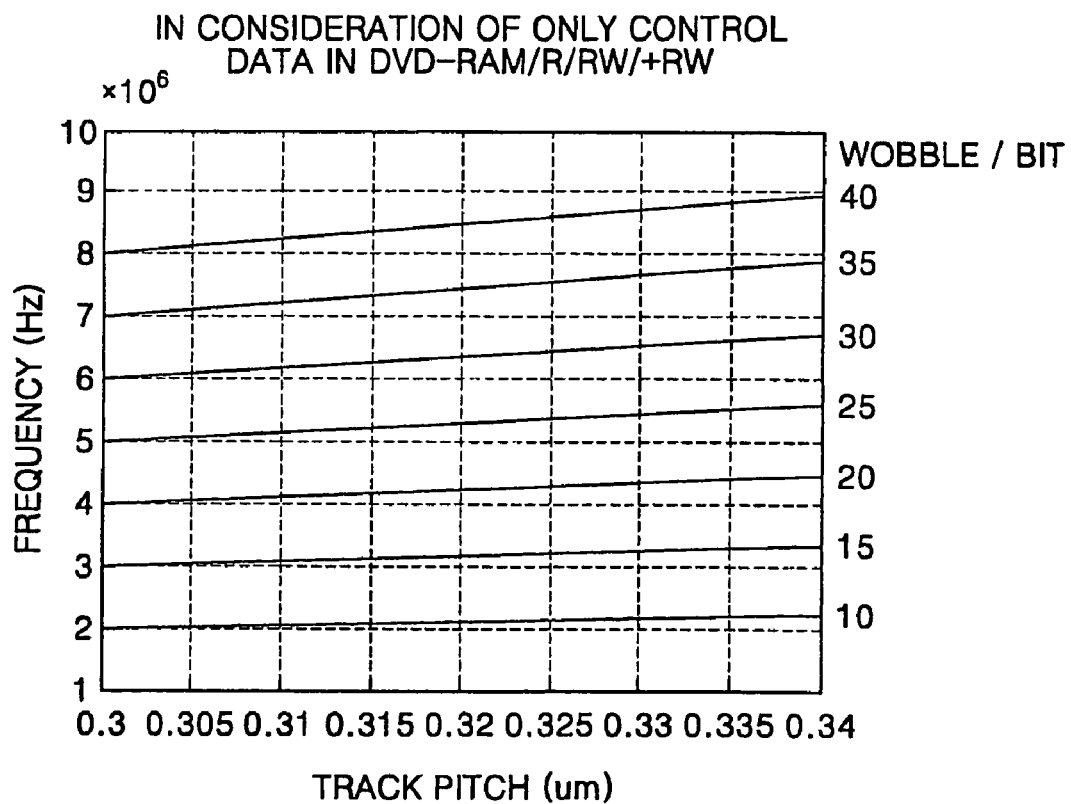
FIG. 8 is a graph illustrating relationships among the number of wobbles per bit, frequency of the wobbles, and track pitches of the wobbles in recorded wobble data of the optical disc of FIGS. 5A through 6.

FIG. 8 is a graph illustrating relationships among the number of wobbles, a frequency of the wobbles and track pitches of the wobbles which are required per bit of wobble data if the first wobble is the saw-toothed wobble 12. Here, a radius of the read-only area 10 is from about 22.3 mm to 23.1 mm, the track pitch is from about 0.30 µm to 0.34 µm, and the number of wobbles in the read-only area 10 is from 10 to 40 in groups of five wobbles. Each of tracks formed in the read-only area 10, the connection area 20, and the readable/writable area 30 has the same track pitch. For instance, if the number of wobbles per bit of the wobble data is set to be thirty five when a track pitch is 0.32 µm, the frequency of the wobble is 7.5 MHz in the read-only area 10, which is very high frequency in consideration of a fact that the frequency of the wobble generated by a general DVD is less than 1 MHz. The frequency of the wobble can be variously set by controlling the track pitch and the number of the wobble per bit of the wobble data.

Figure 9:
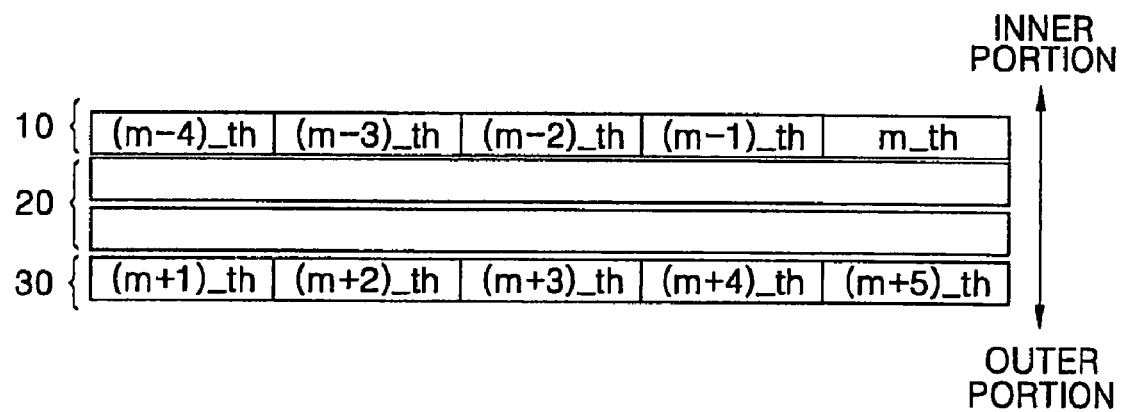
FIG. 9 is a view explaining a relationship between a first physical address of a read-only area for only reading and a second physical address of a readable/writable area in the optical disc of FIGS. 5A through 6.

For continuity of an address, it is possible that a first physical address of the readable/writable area 30 is disposed next to a last physical address of the read-only area 10. As shown in FIG. 9, if the last physical address of the read-only area 10 is m, the first physical address of the readable/writable area 30 must be m+1.

In general, a signal obtained from the wobble during writing/reading operations is used as a reference clock signal during a writing operation. However, the optical disc according to the present invention requires an additional clock signal to obtain a data signal from the first wobble 12 or 14, because the first wobble 12 or 14 of the read-only data is the high-frequency wobble and the second wobble 32 or 34 in the readable/writable area 30 is the low-frequency wobble different from the first wobble 12 or 14. In other words, the reference clock signal in the read-only area 10 is different from a wobble clock signal in the readable/writable area 30. Therefore, the reference clock signal generated by a drive system is used to read the wobble of the read-only data, but another reference clock signal for the low-frequency wobble of the readable/writable area 30 is generated from the wobbles of the read-only data in the read-only area 10.

Figure 10:
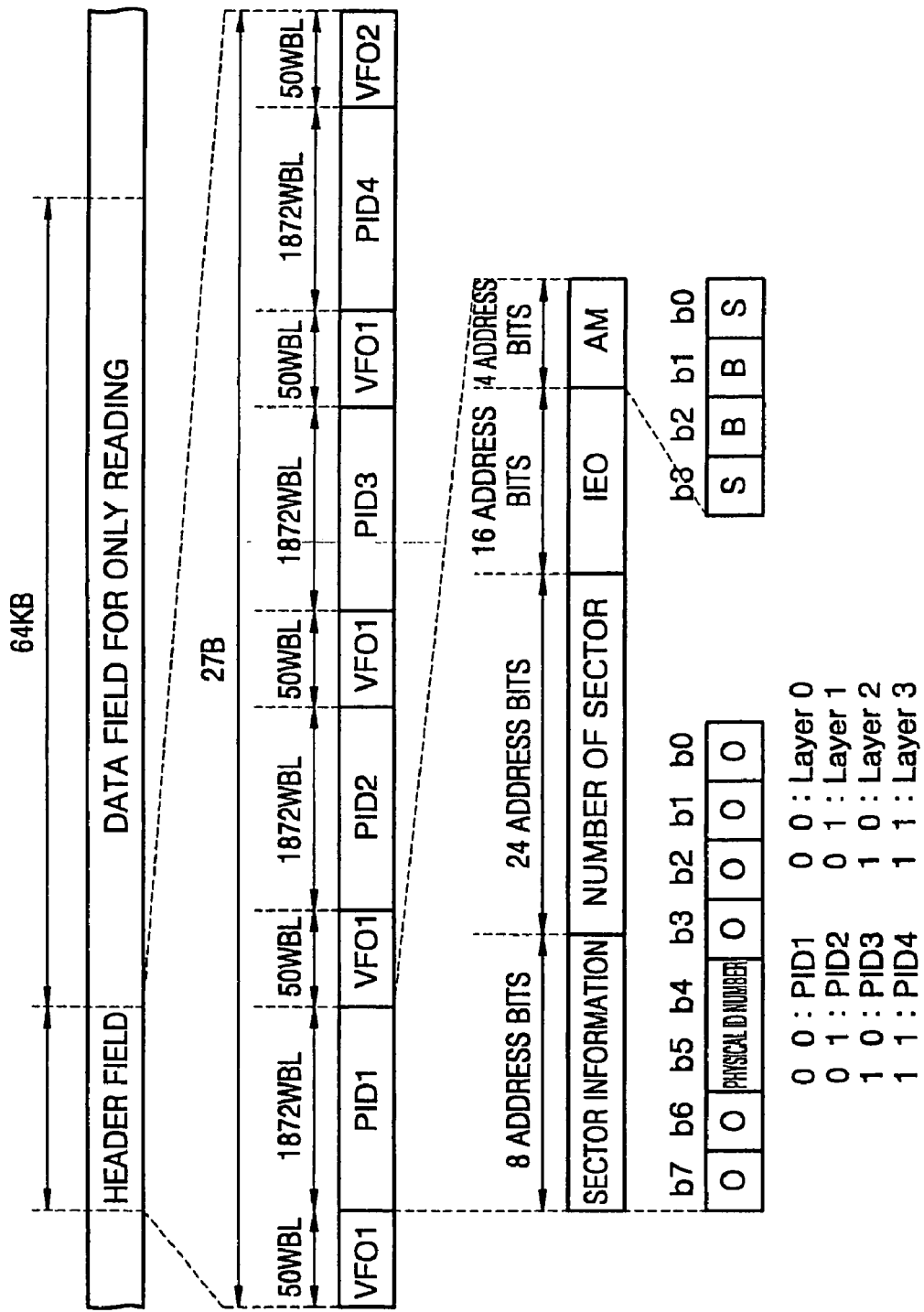
FIGS. 10 and 11 are views each explaining a header field in a read-only area in the optical disc of FIGS. 5A through 6.

If an address, which represents a position in the optical disc, is written as the wobble on the groove, the address may be repeatedly written to all basic minimum write units, and data may be written according to a modulation mode determined by the groove in the readable/writable area 30. Meanwhile, in an event that the read-only data is written as the first wobble 14, which is the high-frequency wobble, in the read-only area 10, the read-only area 10 may be defined by a header field that contains address data, and a data field containing the read-only data written as the high-frequency wobble on the groove, as shown in FIG. 10. The header field may include a physical address (PID) area that is expressed in basic minimum write units such as a sector, and a variable frequency oscillator (VFO) area containing information having a specific pattern for stably operating the phase locked loop (PLL) of a reproducing circuit of the reproducing apparatus. The header field may be disposed at a head or end portion of error correction code (ECC) write units disposed in the read-only area 10 or as an interface between the ECC write units.

Figure 11:
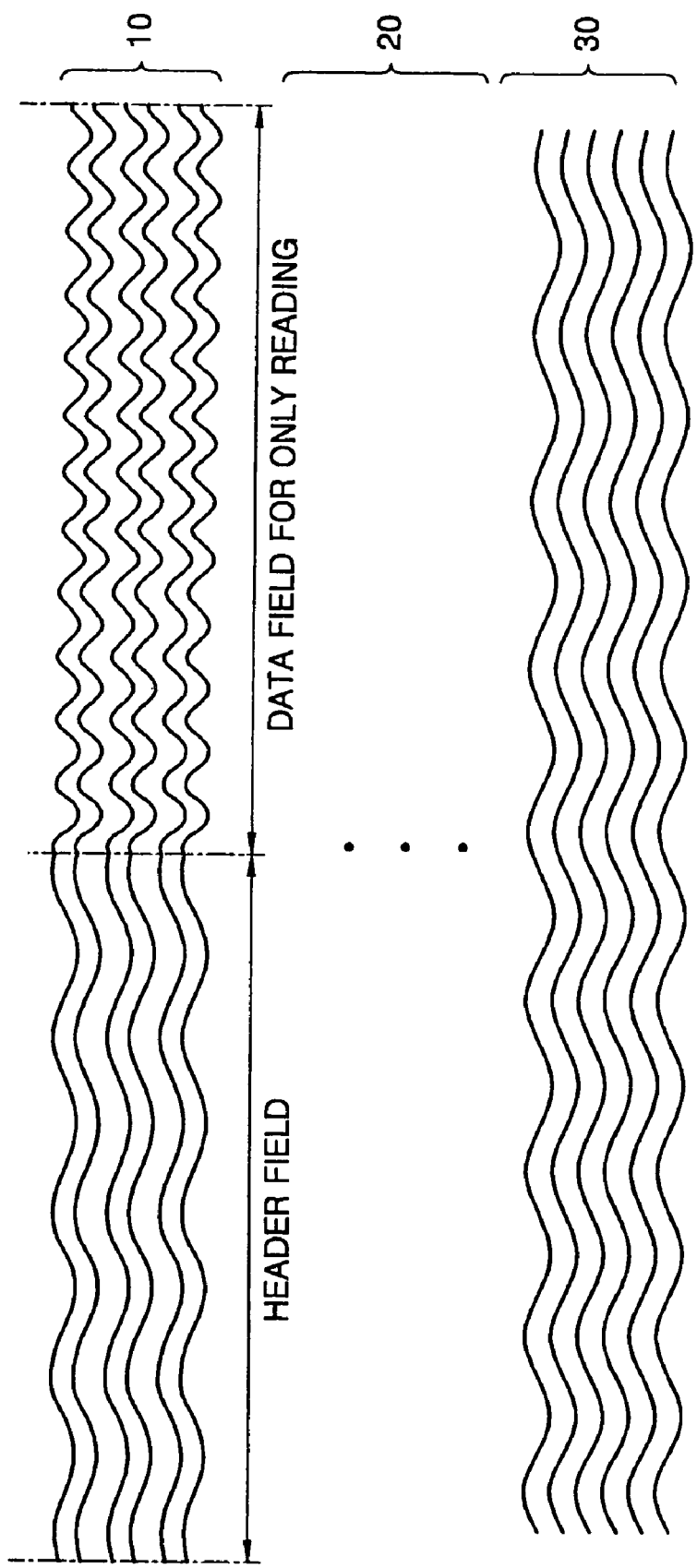

The address data written in the header field of the read-only area 10 is very important data which must be necessarily read before reading other written data. If the address data has a higher frequency than that of the second wobble in the readable/writable area 30, a signal read from the first wobble, which contains the address data, becomes smaller than another signal read from other written data in the readable/writable area 30 or the user data in the user data area of FIG. 7. If the signal of the address data is small, this decreases an address detection capability of the optical disc, thus lowering the reliability of the reading/writing operations of the reproducing apparatus. To solve this problem, as shown in FIG. 11, the header field uses the same low frequency as the second wobble 32 or 34 used in the readable/writable area 30, and the data field for only reading uses the high-frequency wobble. As a result, the address data can be uniformly detected throughout the optical disc, and thus the reading/writing capability of the optical disc can be enhanced.

Figure 12:
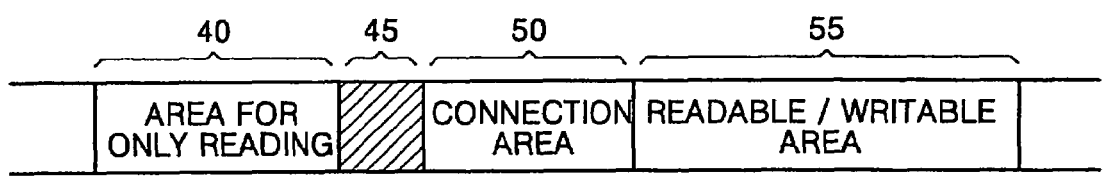
FIG. 12 is a view of another data structure of the optical disc according to another embodiment of the present invention.

As can be seen from FIG. 12, another optical disc according to another embodiment of the present invention may further include an end-marking area 45 that provides a drive (not shown) with data and that a connection area 50 and a readable/writable area 55 follow a read-only area 40 having the high frequency. The end-marking area 45 is formed of wobbles that are different from the wobbles in the read-only area 40. For instance, a wobble in the end-marking area 45 is different from that in the read-only area 40 in terms of at least one of frequency, phase, period and amplitude.

Figure 13:
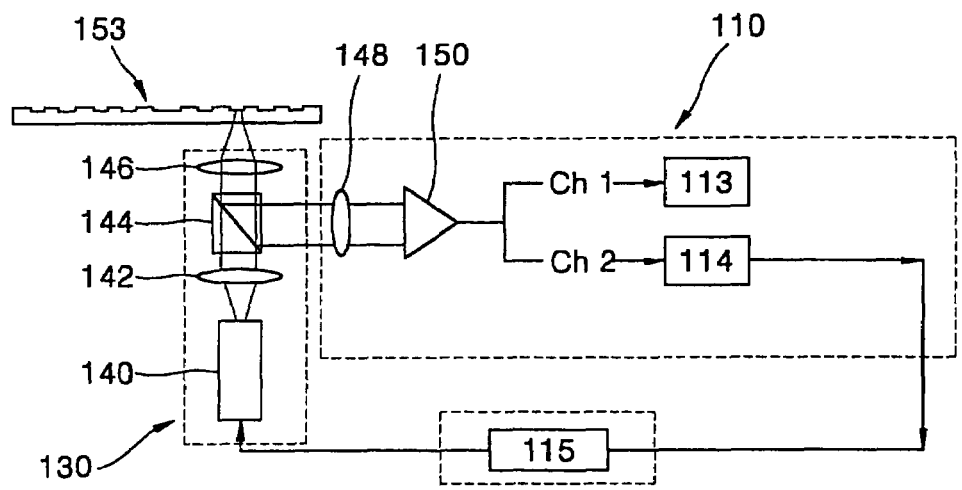
FIG. 13 is a schematic view of an optical disc recording/reproducing system according to another embodiment of the present invention.

FIG. 13 is a schematic view of an optical disc recording/reproducing system according to another embodiment of the present invention. This system includes a read/write signal processor 110, a servo controller 115, and an optical pickup 130 that is used to read data from a disc 153. The optical pickup 130 includes an optical source 140 that supplies a laser beam (light), a collimating lens 142 that collimates the laser beam output from the optical source 140, a beam splitter 144 that changes a path of the laser beam, and an objective lens 146 that focuses the laser beam, which passes through the beam splitter 144, on a portion of the disc 153. The read/write signal processor 110 includes a photodetector 148 that receives the laser beam reflected from the disc 153, an operational circuit unit 150 that processes an electric signal output from the photodetector 148, a user data detector 113 that detects a radio-frequency (RF) signal out of signals output from the operational circuit unit 150, via a first channel Ch1, and a wobble signal detector 114 that detects a tracking error signal and a wobble signal, via a second channel Ch2.

In conclusion, the optical disc according to the present invention includes the connection area 20 and the end-marking area 45 thus increasing the reading/writing operations. Further, it is possible to more stably and completely perform a reading/writing performance on the optical disc using the optical disc recording/reproducing system.

As described above, according to the present invention, the optical disc includes the grooves, the first wobbles in the read-only area, which are differently formed from the second wobbles in the readable/writable area, and the connection area formed between the read-only area and the readable/writable area. In particular, the connection area can prevent the occurrence of a crosstalk between two areas having different wobbles. Accordingly, the reading/writing operations can be stably and completely performed throughout the entire optical disc.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A reproducing system compatible with an optical disc in which data is written on and/or read from, the optical disc comprising a lead-in area including a read-only area having a first wobble, a readable/writable area having a second wobble that is different from the first wobble, and a connection area formed between the read-only area and the readable/writable area, the system comprising:

an optical pickup unit to read a first wobble of the read-only area of the optical disc and a second wobble of the readable/writable area of the optical disc; and a processor controlling the optical pickup unit to transfer data with respect to the read-only area and the readable/writable area in the lead-in area.

2. The system of claim 1, wherein, in the optical disc, the first wobble has a high frequency, and the second wobble has a low frequency lower than the high frequency of the first wobble.

3. The system of claim 2, wherein, in the optical disc, the connection area comprises a mirror area.

4. The system of claim 2, wherein, in the optical disc, the high frequency of the first wobble is expressed as a function of the low frequency of the second wobble by $$f_{HF} = n f_{LF},$$

where n is a positive integer, and fHF and fLF denote the high and low frequencies of the first wobble and the second wobble, respectively.

5. The system of claim 1, wherein, in the optical disc, the first wobble comprises a saw-toothed wobble.

6. The system of claim 1, wherein, in the optical disc, the connection area comprises a mirror area.

* * * * *

UNITED STATES PATENT AND TRADEMARK OFFICE
CERTIFICATE OF CORRECTION

| | | |
|---|---|---|
| PATENT NO. | : 7,400,560 B2 | Page 1 of 1 |
| APPLICATION NO. | : 11/432544 | |
| DATED | : July 15, 2008 | |
| INVENTOR(S) | : Kyung-geun Lee et al. | |

It is certified that error appears in the above-identified patent and that said Letters Patent is hereby corrected as shown below:

First Page, Column 2 (Other Publications), Line 1, change "Appliction" to --Application--.

Column 8, Line 21, change "fHF and fLF" to --$f_{HF}$ and $f_{LF}$--.

Signed and Sealed this

Eighteenth Day of November, 2008

JON W. DUDAS
*Director of the United States Patent and Trademark Office*